Nov. 10, 1936.  S. R. HARDING  2,060,308
EDUCATIONAL TEST CHECKING DEVICE
Filed April 15, 1935  2 Sheets-Sheet 1
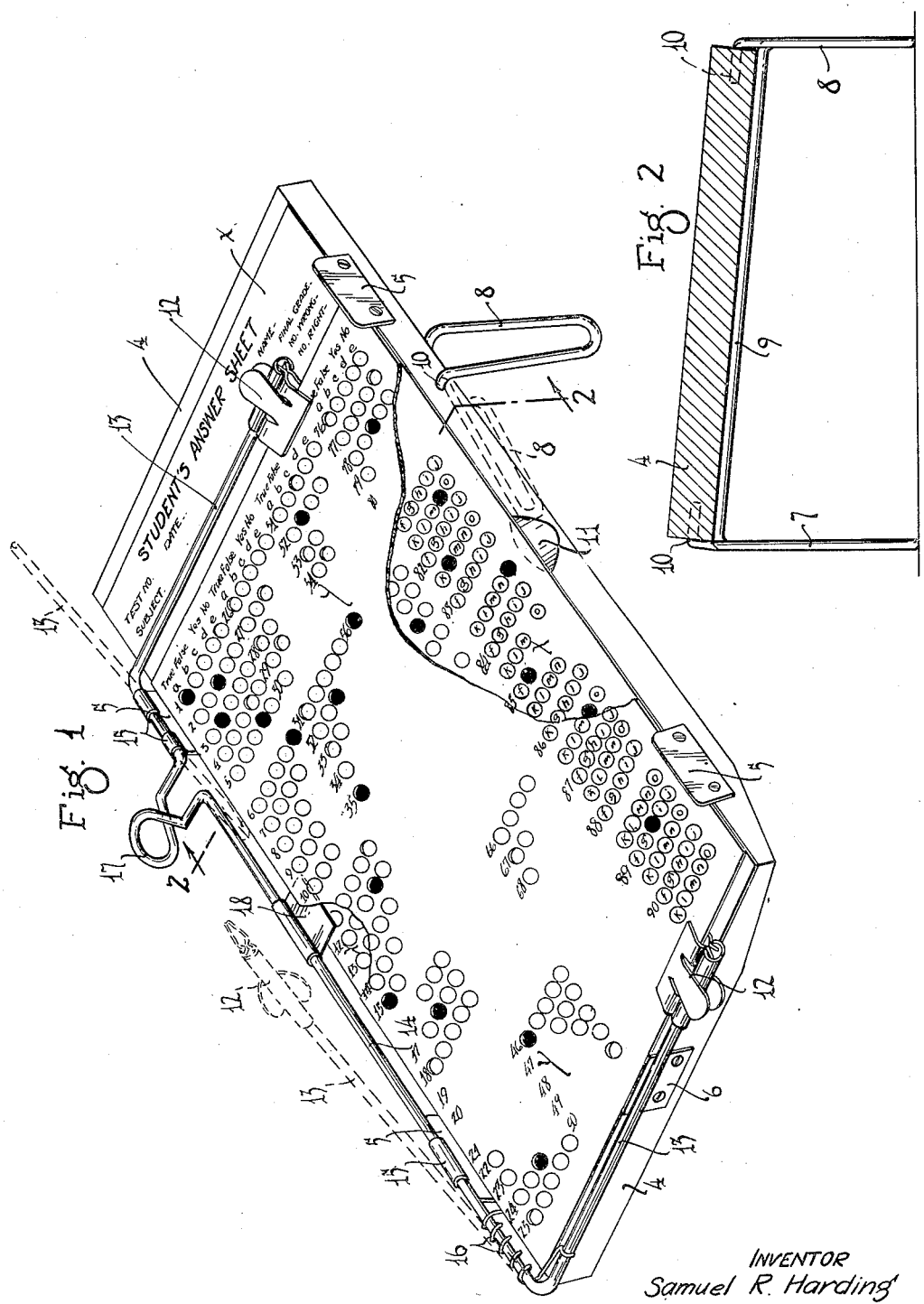
INVENTOR
Samuel R. Harding
BY HIS ATTORNEYS Nov. 10, 1936.  S. R. HARDING  2,060,308

EDUCATIONAL TEST CHECKING DEVICE

Filed April 15, 1935  2 Sheets—Sheet 2

Fig. 3

*Frequency of Error Sheet*

INVENTOR
Samuel R. Harding
BY HIS ATTORNEYS

Patented Nov. 10, 1936

2,060,308

UNITED STATES PATENT OFFICE 2,060,308

EDUCATIONAL TEST CHECKING DEVICE

Samuel R. Harding, Aberdeen, S. Dak.

Application April 15, 1935, Serial No. 16,342

1 Claim. (Cl. 35—48)

My present invention relates to an educational test checking device for schools, colleges, and the like and has for its object the provision of such a device that is extremely simple and of comparatively small cost to manufacture so that each classroom teacher can afford to have one.

The teacher, by the use of this device, saves a great deal of time in correcting a set of test papers and at the same time avoids making mistakes. By running a set of test papers through the device a second time a frequency of error record may be made of the total number of incorrect answers given in the test.

To the above end, generally stated, the invention consists of the novel devices and combinations of devices hereinafter described and defined in the claim.

In the accompanying drawings, which illustrate the invention, like characters indicate like parts throughout the several views.

Referring to the drawings:

Fig. 1 is a perspective view of the improved educational test checking device;

Fig. 2 is a view partly in elevation and partly in section taken on the line 2—2 of Fig. 1, with some parts broken away and sectioned and other parts shown in different positions by means of broken lines; and Fig. 3 is a plan view of a frequency of error sheet.

The numeral 4 indicates a table which, as shown, is a flat rectangular board having on each side a pair of edgewise spaced sheet-positioning lugs 5 and also having a like lug 6 on its foot. These sheet-positioning lugs 5 and 6 are, as shown, metal plates secured by screws to the respective edges of the table 4.

The table 4, at its head, may be held raised by a leg structure which includes a pair of cross connected legs 7 and 8. The cross-tie member between the legs 7 and 8 is indicated by the numeral 9 and which member and legs are formed from a single heavy wire. Said legs 7 and 8 are U-shaped and are formed by folding the end portions of the wire upon themselves. This wire, outwardly of the legs 7 and 8, is bent laterally therefrom to afford a pair of axially aligned trunnions 10 that extend into bore-like seats therefor in the two longitudinal edges of the table 4 and pivotally support the leg structure for folding movement onto the underside of the table 4. By withdrawing the trunnions 10 from their seats the leg structure may be readily removed from the table 4. The trunnions 10 are relatively near the head of the table 4 and the legs 7 and 8 are located just outside of said table so that when the leg structure is folded said legs overlap the longitudinal edge portions of the table 4, as shown by broken lines in Fig. 1. It will be noted that the table 4 rests on the cross-tie member 9 and that the leg 7 is longer than the leg 8 and thus supports the table 4 so that it tilts transversely.

Formed in the right hand side of the table 4, between the sheet-positioning lugs 5, is a finger notch 11 which permits one or more sheets on the table 4 to be gripped and lifted therefrom.

A pair of sheet-holding spring clips 12 are fixed to the free ends of a pair of arms 13 rigidly connected by a cross-tie member 14. As shown, the arms 13 and cross-tie member 14 are formed from a single piece of heavy wire. The cross-tie member 14 is mounted to turn about its axis in bearings 15 on the upper edges of the left hand positioning lugs 5 and hold the arms 13 transversely of said table. A coiled spring 16, encircling the cross-tie member 14, has one of its ends secured to the lowermost arm 13 and its other end engages the table 4 as a base of resistance.

This spring 16 normally and yieldingly holds the arms 13 with the clips 12 on the table 4. Said clips 12 are in opposing relation and it is important to note that the lower arm 13 is outside of the sheet-positioning lug 6 so that said arm and its clip 12 do not interfere with the positioning of a sheet on the table 4.

Formed in the cross-tie member 14, just below the upper bearing 15, is an outwardly projecting finger piece 17 by which said member may be rocked to lift the arms 13 from the table 4 against the tension of the spring 16. Fixed to the cross-tie member 14, between the bearings 15, is a sheet support 18.

Used in connection with my improved educational test checking device is a student's answer sheet X, a teacher's key sheet Y, and a frequency of error sheet Z. On the top portion of the student's answer sheet X, in addition to the name, are certain other indicia such as "Test number"— "Date"—"Subject"—"Name"—"Final grade"— "No. wrong"—"No. right." Below these indicia are printed four series or groups of circles and each series or group thereof includes five columns of circles of twenty-five circles in each column. Said columns of each series are designated by the letters a, b, c, d, e, reading from the left to the right.

Ninety questions may be answered on the answer sheet X and columns a—b of the first eighty questions are for answers to "true"—"false" questions, respectively, and columns d—e are for answers to "yes"—"no" questions, respectively. "Multiple choice" questions may require the use of the five columns a, b, c, d, and e. Questions eighty-one to ninety are "Matching" questions and each thereof includes a group of ten circles and said circles are designated by the letters "f to o", inclusive.

The teacher's key sheet Y is identical with the student's answer sheet X, except that it is shorter at the top so that when placed on an answer sheet X with its circles in registration with the circles on the student's answer sheet, the indicia on said student's sheet will not be covered. It is also slightly shorter at the bottom and slightly narrower at both the right and left edges so it will work freely up and down between the pairs of sheet-positioning lugs 5 and also swing clear of sheet-positioning lug 6.

The frequency of error sheet Z is the same length and width as the teacher's key sheet Y and has the same answer numbers. After each answer number is a broken line.

It is important that the width of the student's answer sheets X be the same as the width of the table so that they fit without lateral play between the pairs of sheet-positioning lugs 5.

Examples of types of questions

One type of question which may be checked with this checking device is commonly called the "multiple choice" question.

The following is one example of a multiple choice question:

Who was the first President of the United States?
    a. Thomas Jefferson
    b. John Hamilton
    c. Abraham Lincoln
    d. George Washington
    e. James Madison A second type of question which may be checked with this device is what is commonly called a "true"—"false" question. It consists of either a positively "true" statement or a definitely "false" statement.

The following is one example of a "true"—"false" question:

Abraham Lincoln was the first president of the United States.

A third type of question which may be checked with this device is known as the "yes"—"no" question. The answer to it is either "yes" or "no". The following is one example of a "yes"—"no" question:

Was Abraham Lincoln the first president of the United States?

A fourth type of question which may be checked with this device is known as the "matching" type of question.

The following is an example of a set of ten "matching" questions:

| A | B |
|---|---|
| 81. Longfellow | f. Silas Marner |
| 82. Whittier | g. Pilgrim's Progress |
| 83. Eliot | h. Snow-Bound |
| 84. Mark Twain | i. Evangeline |
| 85. John Bunyon | j. Tom Sawyer |
| 86. Robert L. Stevenson | k. David Copperfield |
| 87. Washington Irving | l. Legend of Sleepy Hollow |
| 88. Charles Dickens | m. Merchant of Venice |
| 89. Shakespeare | n. Treasure Island |
| 90. Poe | o. The Raven |

The columns in the above example of matching questions are numbered and lettered in the manner in which they would need to be when used with the answer sheet illustrated in Fig. 1.

There are other types of questions which may be checked with this device, such as the identification of points on a map, items on a diagram, or parts of a machine.

The following is an example of a "map location" question:

Note: On the question sheet would appear a map of the United States with letters f, g, h, i, j, k, l, m, n, o, respectively, located at points on the map indicating the location of leading cities.

*Indicate the location of the following cities:*

81. New York
    82. Chicago
    83. New Orleans
    84. Philadelphia
    85. San Francisco
    86. Minneapolis
    87. Washington
    88. Boston
    89. Denver
    90. Seattle The cities in the above example have been numbered for use with the question sheet which is shown in Fig. 1.

Any portion of the answer sheet may be used for identification and matching tests if no more than five responses are required. However, portions of the answer sheet are especially prepared for such questions as call for more than five responses. If ten are desired a portion of the answer sheet is prepared as illustrated in Fig. 1, answer spaces 81 to 90, with ten circles for each number on the answer sheet. Fifteen responses may be checked by preparing the answer sheet with three rows of circles, or fifteen circles, for each number. With the answer sheet illustrated in Fig. 1 a set of ten matching or identification questions would use answer spaces 81 to 90, inclusive.

Operation

The use of the improved educational test checking device illustrated may be briefly described as follows:

In addition to the student's answer sheet X, the teacher's key sheet Y and the frequency of error sheet Z, there will be a question sheet for each student, but, for the purpose of this case, it is not thought necessary to illustrate the same. From this question sheet the teacher prepares her key sheet Y by punching out the circles which represent correct answers. Each student taking a test is given a copy of the question sheet or sheets and one of the answer sheets X and answers the question of the question sheet or sheets by darkening the circles, on the student's answer sheet X, which he thinks represents the correct answer. After the student has answered the questions by darkening the circles on the answer sheet which he thinks represents the correct answers to the questions on the question sheet, said answer sheet is given to the teacher. The teacher then places the student's answer sheets for the entire class, or part thereof, in a stack on the table 4. The longitudinal inclination of the table 4 will cause the answer sheets X to slide to the foot of said table until stopped by the positioning lug 6 and thereby be positioned longitudinally on the table 4. The pairs of sheet-positioning lugs 5 will hold the answer sheets in position laterally.

The teacher then places the prepared key sheet

Y on the uppermost answer sheet X and positions the same by looking through the holes which have been punched in the key sheet Y so that the punched holes are in registration with the respective circles on the underlying answer sheet X. Next, the key sheet Y is secured to the arms 13, at its upper and lower edge portions, by means of the clips 12 and it is important to see that the said key sheet, at its left hand edge portion, rests on the support 18 so that it will be moved with the arms 13 when raised. With the key sheet Y thus positioned on the uppermost answer sheet X, the teacher can see at a glance the correct and incorrect answers on the student sheet through the cut out circles on the key sheet Y.

Darkened circles on the student's sheet X appearing in the respective cut out circles on the teacher's key sheet Y, will represent correct answers and when counted the total number may be marked on the line appearing after the words "No. right" on student's answer sheet X. All white circles on the student's answer sheet X appearing through the respective cut out circles on the key sheet Y represent incorrect answers and when counted the total number may be marked on the student's answer sheet X after the words "No. wrong".

The arms 13 are then raised, by means of the finger piece 17, to lift the key sheet Y from the underlying answer sheet X and said answer sheet removed from the table 4. The arms 13 are thereafter lowered to again position the key sheet Y on the uppermost answer sheet X. It will thus be seen that the key sheet Y may be accurately positioned on successive answer sheets X.

If a frequency of error record is to be made the sheet Z is punched at the same time that the key sheet Y is punched by being attached to the under side of the key sheet Y. The holes in the frequency of error sheet Z, after given question numbers, represent correct answers. After a set of test papers have been corrected, the key sheet Y is removed from the clips 12 and the frequency of error sheet Z substituted therefor. When the frequency of error sheet Z is positioned on a student answer sheet X in proper registration therewith, by means of the arms 13, the correct and incorrect answers on said sheet X will appear through the holes in the frequency of error sheet Z. For each incorrect answer on the student's answer sheet X a mark, thus (/), is made with a pencil or a pen after the number of the respective question.

When all of the incorrect answers on a student answer sheet X are noted on the frequency of error sheet Z, the arms 13 are raised to lift the frequency of error sheet Z from the uppermost student answer sheet X and said sheet X removed from the table 4. Next, the arms 13 are lowered to position the frequency of error sheet Z on the next student answer sheet X and the incorrect answers noted on the frequency of error sheet Z.

From the above description it is evident that a set of test papers may be corrected by a teacher just as fast as the arms 13 can be operated to position the key sheet Y on a student answer sheet X, the right and wrong answers counted and marked on the student answer sheet X and said arms raised to permit the removal of the sheet Y from the table 4.

It is also evident that a frequency of error record may be made in the same manner and very quickly.

After the key sheet Y or the frequency of error sheet Z is once secured to the arms 13 by the clips 12 in correct registration with a student answer sheet X, said key sheet Y or frequency of error sheet Z will always be correctly positioned by the arms 13 on successive student answer sheets X as long as said sheets X are held positioned by the lugs 5 and 6.

While the table 4 is shown and described as being transversely tilted by making one of the legs 7 and 8 shorter than the other, it is, of course, understood that both legs may be of the same length and the table supported on its entire lower end instead of on one corner, as shown.

From what has been said, it will be understood that the educational test checking device described is capable of modifications as to details of construction and arrangement within the scope of the invention herein disclosed and claimed.

What I claim is:

In a device of the class described, a table having means for positioning thereon a stack of sheets each having indicia, a holder attached to the table for raising and lowering movements relative to the stack, and a sheet-like member having apertures, said member being held by the holder against relative movement and also being held thereby over the stack with its apertures in predetermined position to the indicia on the uppermost sheet in the stack, whereby if any of the indicia on said sheet is in registration with any of the apertures in said member, the same will be exposed therethrough, the sheets in the stack being free to be successively removed from the top of the stack without imparting movement to said member which would change the relative position of the apertures to the indicia on the underlying sheets in the stack.

SAMUEL R. HARDING.